(12) United States Patent
Chen et al.

(10) Patent No.: US 6,396,674 B1
(45) Date of Patent: May 28, 2002

(54) SYSTEM AND METHOD FOR MONITORING THE OPERATION OF A POWER CONVERTER

(75) Inventors: Chingchi Chen, Ann Arbor; Venkateswara Anand Sankaran, Farmington Hills, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/547,360

(22) Filed: Apr. 11, 2000

(51) Int. Cl.[7] ................................................ H02H 3/00
(52) U.S. Cl. ...................................... 361/93.7; 361/111
(58) Field of Search .............................. 361/18, 23, 28, 361/29, 30, 31, 93.9, 93.7, 111; 323/276, 281, 282, 284, 285; 363/50

(56) References Cited

U.S. PATENT DOCUMENTS

| | | | |
|---|---|---|---|
| 4,947,101 A | * 8/1990 | McVey | 323/284 |
| 4,958,121 A | 9/1990 | Cuomo et al. | 361/111 |
| 5,528,446 A | 6/1996 | Sankaran et al. | 361/25 |
| 5,559,656 A | 9/1996 | Chokhawala | 361/18 |
| 5,596,466 A | 1/1997 | Ochi | 361/18 |
| 5,687,049 A | 11/1997 | Mangtani | 361/18 |

* cited by examiner

Primary Examiner—Ronald W. Leja

(57) ABSTRACT

A fault detection circuit and method for monitoring a power converter system to identify faults. The detection circuit includes two comparator circuits each having one input connected to the dc bus of the power converter system and responsive to the voltage spikes that occur as a result of faults. The other inputs of the comparator circuits are respectively connected to first and second sources of reference voltages having preset limits. The outputs of the two comparator circuits are combined on an output lead, and a fault signal will be produced on the output lead when the voltage spike on the dc bus exceeds the limits.

8 Claims, 1 Drawing Sheet

SYSTEM AND METHOD FOR MONITORING THE OPERATION OF A POWER CONVERTER

BACKGROUND OF THE INVENTION

1. Field of the Invention

The present invention relates to power converter systems, and more particularly to detection circuits and methods for monitoring power converter systems to identify faults.

2. Description of the Prior Art

Among the many fault conditions encountered by electronic power conversion systems, shoot-through and short circuit conditions are the most disastrous and which could destroy the system in microseconds. To protect the systems from these accidents, many fault detection techniques have been widely used. For example, a technique of desaturation detection is available that depends on the fact that the power converter device terminal voltage should be low when turned on. If it is not low, then either the gate drive is faulty or huge current is saturating the device. Current sensors could be used to detect over-current situations. However, the speed of such sensors is limited.

An example of a prior art technique for the protection of power converter systems from faults is disclosed in U.S. Pat. No. 4,958,121 issued Sep. 18, 1990 to Cuomo et al. entitled PROTECTION OF POWER CONVERTERS FROM VOLTAGE SPIKES.

In this patent a protection system for power converter systems is disclosed comprising a voltage spike sensing circuit for generating a logic signal in the presence of a voltage spike, and logic means responsive to the logic signal from the spike sensing circuit for opening a first analog switch and closing a second analog switch.

Other references of general interest include U.S. Pat. Nos. 5,528,446, 5,559,656, 5,596,466 and 5,687,049.

SUMMARY OF THE INVENTION

An object of the present invention is to provide a system for monitoring the switching spikes on the dc bus of a power converter to identify disastrous faults and out-of-range parameters. The system observes the height, width and shape of the spikes so that high-speed faults such as shoot-through or low-impedance short-circuit conditions can be detected immediately. Out of range series resistance due to rusty bolts, loosened screws, and a deteriorating or missing capacitor bank can be detected. Further, the switching speed of the active devices can be estimated by simple techniques.

DESCRIPTION OF A PREFERRED EMBODIMENT

Figure 1:
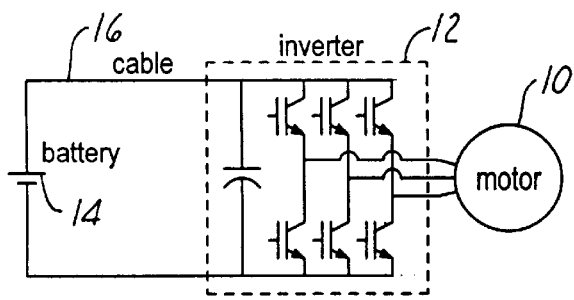
FIG. 1 is a schematic illustration of a power converter used in the present invention.

Referring to FIG. 1, an illustration of a multi-phase motor drive system is shown including a motor 10, an inverter 12, a battery 14, a cable 16 and a dc bus 18 with a bus capacitor 20.

Figure 2:
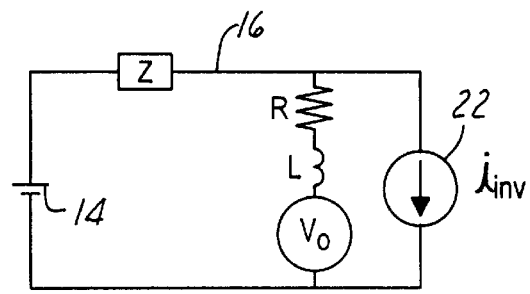
FIG. 2 is a schematic illustration of the DC bus equivalent circuit of the power converter of FIG. 1.

In FIG. 2, the equivalent circuit of the multi-phase motor drive system of FIG. 1 is illustrated wherein the major stray parameters of the system are shown, and wherein the inverter 12 and the motor 10 combination is replaced by an equivalent current source 22. Normally the impedance of the battery 14 and cable 16 is much higher than that of the dc bus capacitor 20 and it can therefore be neglected and treated as an open-circuit. As such, the bus voltage spikes $V_{spike}$ during the switching transients can be approximated by the following equation:

$$V_{spike} = Ri_{inv} + L di_{inv}/dt = V_R + V_L \qquad (1)$$

where R and L are the stray parameters of the capacitor bank, and $V_R$ and $V_L$ represent the resistive and inductive portion of the voltage spike.

A technique for detecting the resistive voltage drop of the voltage spike is to use a convolution function to correlate the voltage spike and the corresponding current waveforms. The convolution function is expressed as follows:

$$\hat{R} = \frac{\int_0^T (V_{spike} \cdot i_{dc}) dt}{\int_0^T (i_{dc} \cdot i_{dc}) dt} \qquad (2)$$

where 0 is the time when the transient begins and T is the time before the next transient occurs. This equation gets rid of the inductive portion of the voltage spike because the resistive voltage drop correlates to the $i_{inv}$ waveform very tightly.

Also, it should be noted that the resistance of a system is normally a function of temperature and it varies accordingly; however, it should be a fairly predictable variable and must be within an acceptable range. If the resistance of the system is too far out of the acceptable range, an abnormal situation very likely occurred, such as rusty bolts, loosened screws, a deteriorating or missing capacitor bank and the like. Warning indications can then be provided long before disastrous situations occur.

If the resistance of the equivalent circuit of FIG. 2 is estimated, the inductive voltage portion can be approximated by $$V_L = V_{spike} - Ri_{inv} \qquad (3)$$

However, R is a normally a very small number, therefore Equation (3) can be approximated by:

$$VL \cong V_{spike} = (L)(di_{inv}/dt) \qquad (4)$$

Figure 3:
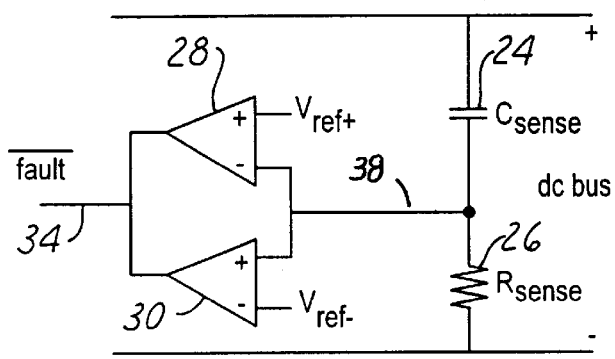
FIG. 3 is a schematic illustration of an embodiment of a fault detection circuit for monitoring the dc voltage spike of the bus of the motor drive circuit of FIG. 1 according to the principles of the present invention.

In contrast to the resistance, the leakage inductance L doesn't vary, and it is only a function of the physical layouts and the dimensions. If so, the spike voltage is closely related to the derivative of the inverter current. Moreover, since the device switching speed is well-defined, the derivative of the current is high only when the amplitude is huge. Counting on this, a very simple way to detect a shoot-through or a catastrophic short-circuit condition, both with very high faulty currents, is shown in FIG. 3, where the capacitor $C_{sense}$ is to block the dc component, and the R/C time-constant is properly selected so that the voltage across the sensing resistor $R_{sense}$ is mainly the voltage spikes.

The simplest protection scheme is to compare the spike voltage on lead 38 connected between $C_{sense}$ 24 and $R_{sense}$ 26 with preset limits, and a fault signal be provided on lead 34 if the amplitude of the voltage spike exceeds the limits. It is to be noted that one protection circuit is sufficient to protect all the switches, since each switching action causes a voltage spike on the dc bus. Also, this simple technique provides very high speed and low-cost solutions for catching catastrophic faults, which is superior to traditional desaturation or current sensor approaches, all of which have the drawback of some time delays.

Thus, the technique of the present invention overcomes the weakness of slower, prior art techniques seamlessly, and provides a very effective means to detect catastrophic faults.

Figure 4:
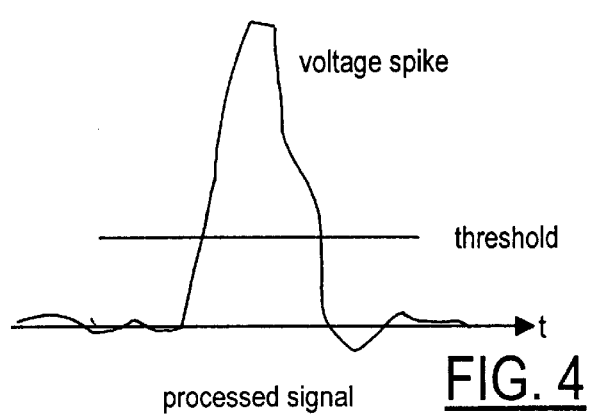
FIGS. 4 and 5 are illustrations of waveforms showing the voltage spike and the measurement of the spike width for approximate switching speed of the active devices of the power converter.
Figure 5:
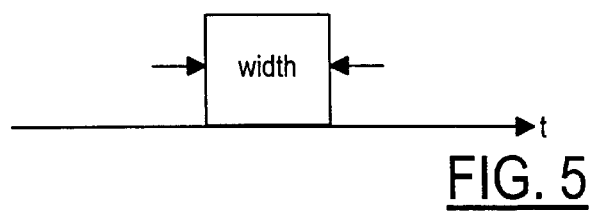

The shape of the spike also enables a simple technique to estimate the switching speed of the active switches of the power converter system. By measuring the pulse width of the spike under certain operating conditions (i.e. device current, voltage, temperature and gate drive parameters etc.) of the power converter, as shown in FIGS. 4 and 5, the speed of the switch can be estimated. Again, the speed should be with in a certain range under certain operating conditions, and this piece of information can be used for protection or for dynamically tuning the system for optimal operating conditions.

What has been disclosed is an improved high-speed, low-cost circuit for monitoring the voltage spikes on the dc bus of a power converter system to detect and identify faults. The circuit observes the height, width and shape of voltage spikes on the dc bus of the system by means of a sense resistor and sense capacitor, and includes comparator means for producing a fault output signal when a voltage spike exceeds predetermined limits.

What is claimed is:

1. A circuit for monitoring the voltage spikes occurring in a power converter system containing a bus having a resistive parameter (R) and an inductive parameter (L) comprising:
    a first comparator circuit having first and second inputs;
    a first reference level voltage source connected to the first input of the first comparator circuit for providing a first voltage level input signal;
    a second comparator circuit having first and second inputs;
    a second reference level voltage source connected to the second input of the second comparator circuit to provide a second voltage level input signal;
    a dc voltage blocking circuit;
    the second input of the first comparator circuit and the first input of the second comparator circuit being connected in common through the dc voltage blocking circuit to the bus of the power converter system and responsive to a voltage spike ($V_{spike}$) thereon;
    wherein the first comparator circuit produces an output signal when a voltage spike on the bus exceeds the voltage level of the first voltage level input signal, and wherein the second comparator circuit produces an output signal when a voltage spike on the bus is lower than the voltage level of the second voltage level input signal.

2. The circuit of claim 1 wherein the power converter system bus includes a sensing resistor ($R_{sense}$), and the dc voltage blocking circuit includes a capacitor ($C_{sense}$) to block dc signal components and to provide a (RC) time constant selected so that the voltage value measured across the sensing resistor ($R_{sense}$) is the value of the voltage spike ($V_{spike}$).

3. The circuit of claim 1 further comprising a fault output lead connected to the outputs of the first and second comparator circuits for providing a fault signal when an output signal is present at the outputs of the first or the second comparator circuits.

4. The circuit of claim 1 wherein the power converter system further includes an inverter portion having a current ($i_{inv}$) and wherein a voltage ($V_L$) of the inductive parameter (L) of the bus is approximately equal to ($V_{spike}$) which is equal to (L) multiplied by ($di_{inv}/dt$).

5. A method for monitoring the voltage spikes ($V_{spike}$) occurring in a power converter system containing a bus having a resistive parameter (R) and an inductive parameter (L) comprising the steps of:
    A. providing a first reference level voltage signal;
    B. providing a second reference level voltage signal;
    C. blocking the dc components of the bus voltage and providing the remaining voltage to a sensing resistor ($R_{sense}$) in the bus of the power converter system;
    D. comparing the voltage across the sensing resistor ($R_{sense}$) with the first reference level signal to provide a first comparison signal when the voltage across the sensing resistor is greater than the first reference level signal; and
    E. comparing the voltage across the sensing resistor ($R_{sense}$) with the second reference level signal to provide a second comparison signal when the voltage across the sensing resistor is lower than the second reference signal.

6. The method of claim 5 wherein the step of blocking the dc signal components of the bus further includes using a sensing capacitor ($C_{sense}$) to provide a (RC) time constant selected so that the voltage value across the sensing resistor ($R_{sense}$) is the value of the voltage spike ($V_{spike}$).

7. The method of claim 5 further including the step of combining the first and second comparison signals to provide a fault indicating signal.

8. The method of claim 5 further including the step of providing a power converter system including an inverter portion having a current ($i_{inv}$) and wherein a voltage ($V_L$) of the inductive parameter (L) of the bus is approximately equal to ($V_{spike}$) which is equal to (L) multiplied by ($di_{inv}/dt$) where ($i_{inv}$) is the inverter current.

* * * * *